(No Model.)

B. F. CADENHEAD.
COTTON SCRAPER.

No. 489,119. Patented Jan. 3, 1893.

Witnesses
Harry L. Amer.
John M. Biggus

Inventor
B. F. Cadenhead.
By his Attorneys,
C. A. Snow & Co.

United States Patent Office.

BENJAMIN FRANKLIN CADENHEAD, OF BLOUNTSVILLE, ALABAMA, ASSIGNOR OF ONE-HALF TO MOSES E. BUTT, OF SAME PLACE.

COTTON-SCRAPER.

SPECIFICATION forming part of Letters Patent No. 489,119, dated January 3, 1893.

Application filed January 30, 1892. Serial No. 419,799. (No model.)

*To all whom it may concern:*

Be it known that I, BENJAMIN FRANKLIN CADENHEAD, a citizen of the United States, residing at Blountsville, in the county of Blount and State of Alabama, have invented a new and useful Cotton-Chopper, of which the following is a specification.

This invention relates to improvements in cotton plows; the objects in view being to provide a plow of cheap and simple construction adapted to be applied to any ordinary form of plow-stock and to be especially adapted for the cultivation of cotton, and capable of use in cultivating young corn, and when used to cultivate cotton to serve to cut out stands of the same; and which by its peculiar construction is adapted to run close to the growing plant.

With these objects in view the invention consists in certain features of construction hereinafter specified and particularly pointed out in the claims.

Figure 1:
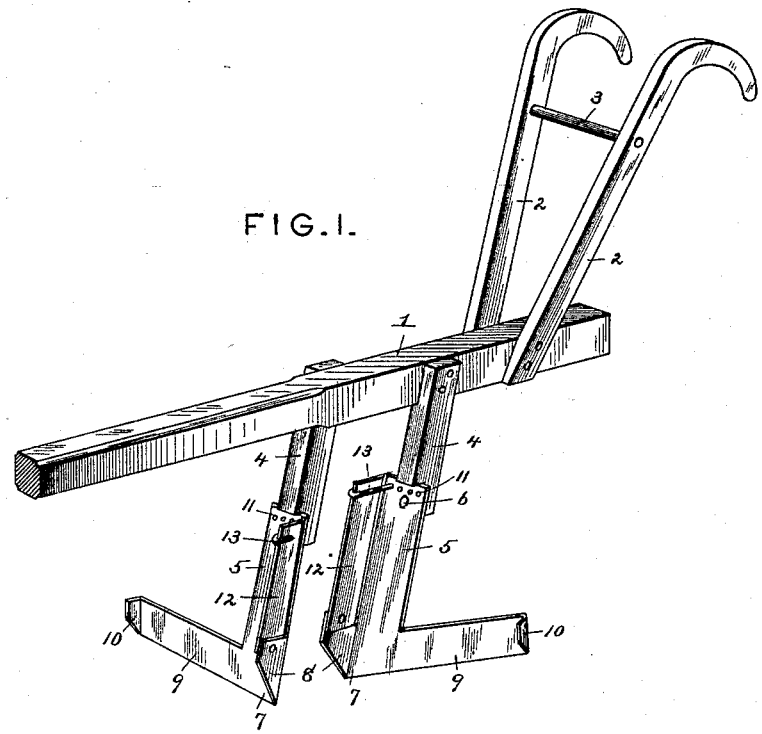
Figure 2:
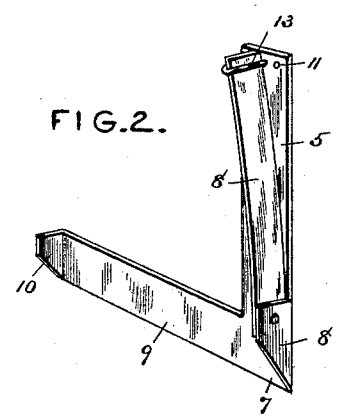
Figure 3:

Referring to the drawings—Figure 1 is a perspective of a plow provided with my improvements. Fig. 2 is a detail in perspective of one of the plows. Fig. 3 is a detail of the J-shaped adjusting bolt.

Like numerals of reference indicate like parts in all the figures of the drawings.

In the present instance 1 designates a plow-stock or beam, from whose rear end rises a pair of diverged handles 2 properly connected near their upper ends by a transverse rung 3. To the opposite sides of the stock or beam a pair of depending standards 4 are connected, said standards being arranged one in advance of the other as shown. To these standards are attached my improved cotton-plows.

My improved plows each consist of a front inclined portion 5, which by a heel-bolt 6, passed through the same near its upper end is secured to its standards 4. The front portion of the plow terminates at its lower end in a point 7, at the inner side of which a land-side 8, is located, and projects forwardly at an angle to the inclined portion 5 and at its opposite edge, said portion 5 is provided with a mold-board side wing 9, which is rearwardly and laterally extended as shown, and terminates at its outer extremity in an upturned edge 10. The portions 5 of the plows are provided at their upper ends with transverse series of bolt holes 11 and bolted or riveted to the land sides 8 are upwardly-disposed resilient blades 12. J-shaped bolts 13 are passed through the perforations of the inclined portions and are nutted at their rear ends while their front ends extend up over and embrace the front edges of the blades 12. Inasmuch as these blades are resilient they may be swung laterally over the face of the plow and by means of the J-shaped bolts be secured in any of their adjusted positions. It will be seen that the two blades are arranged one in advance of the other, while the mold-board wings 9 of the two plows are oppositely disposed with relation to each other and terminate in upturned ends.

It will be obvious that the invention may be applied to either a single or double-foot plow, and when used as a single-foot plow may be adapted for either right or left hand plowing. By the construction described I provide a plow which enables me to cultivate exceedingly close to young corn and to chop out cotton. In chopping the cotton the plow simply forms a furrow through the same, the land-side 8 and upturned wings 10 combining with the front edge of the mold-board to cut the way through the cotton destroying all weeds, grass, and undergrowth that may have sprung up with it. In cultivating corn the soil is not broken but simply cut and the adjustable wing may be so arranged as to prevent the falling of loose dirt upon the plant. The flanges and wings serve as colters cutting all the old roots, cotton-stumps, and other obstacles over which the plow passes. By adjusting the wings across the face of the plow the quantity of earth thrown toward the young plant may be regulated. The plow may be driven across furrows thus thinning the cotton-plant and bringing it to a stand, and may be employed as an ordinary cultivator.

Having described my invention what I claim is:

1. The herein-described plow, consisting of the front inclined-portion 5, terminating at its lower end in a point and provided at the inner side of this point with a land-side flange 8, forming a colter extending forwardly at a right angle to the plow, and at its opposite side provided with a laterally and rearwardly disposed mold-board portion 9, terminating at its end in an upturned portion 10 forming a colter, substantially as specified.

2. The herein-described plow, the same consisting of the inclined portion 5 provided at its land-side with a forwardly-disposed colter arranged at an angle to the portion 5 and at its opposite side with a rearwardly and laterally disposed mold-board portion 9, the extremity of which is upturned to form a colter, the resilient blade connected with the land-side of the plow and adapted to swing across the face of the same, and a bolt passed through the blade and adapted to be inserted in any one of the series of bolt-openings formed in the portion 5, substantially as specified.

3. The herein-described plow, the same consisting of the inclined portion 5, terminating at its lower end in a point and provided at the land side of its point with a flange forming a colter, extending at a right-angle to the portion 5, and at its opposite side with a mold-board portion laterally and rearwardly extended, a resilient blade connected to the land-side flange and a J-shaped bolt engaging over the upper edge of the flange and having its rear end adapted to be passed through any one of the series of bolt openings formed in the portion 5, substantially as specified.

4. The combination with the beam, and the front and rear standards located at opposite sides of the same, of the herein-described plows applied to the standards each consisting of the front inclined portion 5 having a transverse series of perforations near its upper edge and its lower end terminating in a point and provided at its inner side opposite the point with a right angularly bent colter and at its opposite or outer side with a rearwardly and laterally disposed mold board upturned at its outer end to form a colter, substantially as specified.

In testimony that I claim the foregoing as my own I have hereto affixed my signature in the presence of two witnesses.

BENJAMIN FRANKLIN CADENHEAD.

Witnesses:
  ALLEN H. MORING,
  S. C. ALLGOOD.